(12) United States Patent
Kai et al.

(10) Patent No.: US 11,987,719 B2
(45) Date of Patent: May 21, 2024

(54) AQUEOUS DISPERSION OF INORGANIC FIBERS AND METHOD FOR FORMULATING AQUEOUS COATING COMPOSITION THEREFROM

(71) Applicant: GUANGDONG HUARUN PAINTS CO., LTD., Foshan (CN)

(72) Inventors: Weihua Kai, Foshan (CN); Gang Duan, Northbrook, IL (US); Xi Zhao, Foshan (CN); Shigang Fan, Foshan (CN)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 16/487,431

(22) PCT Filed: Feb. 20, 2018

(86) PCT No.: PCT/US2018/018672
§ 371 (c)(1),
(2) Date: Sep. 17, 2019

(87) PCT Pub. No.: WO2018/160380
PCT Pub. Date: Sep. 7, 2018

(65) Prior Publication Data
US 2020/0062988 A1 Feb. 27, 2020

(30) Foreign Application Priority Data
Feb. 20, 2017 (CN) .......................... 201710092628.2

(51) Int. Cl.
| | |
|---|---|
| *C08K 7/06* | (2006.01) |
| *C08K 3/34* | (2006.01) |
| *C08K 7/10* | (2006.01) |
| *C08K 7/14* | (2006.01) |
| *C08K 9/06* | (2006.01) |
| *C09D 5/02* | (2006.01) |
| *C09D 7/45* | (2018.01) |
| *C09D 17/00* | (2006.01) |
| *C09D 133/00* | (2006.01) |
| *C09D 183/04* | (2006.01) |
| *C09D 7/00* | (2018.01) |

(52) U.S. Cl.
CPC ............ *C09D 17/001* (2013.01); *C08K 3/346* (2013.01); *C08K 7/06* (2013.01); *C08K 7/10* (2013.01); *C08K 7/14* (2013.01); *C08K 9/06* (2013.01); *C09D 5/027* (2013.01); *C09D 7/45* (2018.01); *C09D 17/006* (2013.01); *C09D 133/00* (2013.01); *C09D 183/04* (2013.01); *C08K 2201/003* (2013.01); *C08K 2201/016* (2013.01); *C09D 5/024* (2013.01); *C09D 7/00* (2013.01)

(58) Field of Classification Search
CPC ........ C09D 17/001; C09D 7/45; C09D 5/027; C09D 17/006; C09D 133/00; C09D 183/04; C09D 7/00; C09D 5/024; C09D 17/004; C09D 163/00; C09D 167/00; C09D 175/04; C09D 5/03; C09D 5/08; C09D 5/24; C09D 125/14; C09D 5/02; C09D 7/12; C09D 17/00; C08K 3/346; C08K 7/06; C08K 7/10; C08K 7/14; C08K 9/06; C08K 2201/003; C08K 2201/016; C08K 3/34; C03C 25/10; C03C 25/24; C03C 25/40
See application file for complete search history.

(56) References Cited

U.S. PATENT DOCUMENTS

| | | | | | |
|---|---|---|---|---|---|
| 4,084,021 | A | * | 4/1978 | Sandvig .................. | C09D 4/00 427/164 |
| 4,124,730 | A | * | 11/1978 | Albert ..................... | C03B 37/05 427/220 |
| 4,792,580 | A | * | 12/1988 | Doshi .................. | C09D 201/06 523/511 |
| 5,719,206 | A | * | 2/1998 | Mihoya .................... | C09D 7/62 523/213 |
| 2004/0234443 | A1 | * | 11/2004 | Chen ...................... | A23G 3/346 423/432 |
| 2005/0233135 | A1 | * | 10/2005 | Iyer ........................ | C08J 7/0423 428/447 |
| 2006/0178452 | A1 | * | 8/2006 | Hoefler .................... | C08K 3/36 523/212 |
| 2011/0039983 | A1 | * | 2/2011 | Kuehner ................ | B82Y 30/00 523/466 |
| 2012/0288649 | A1 | * | 11/2012 | Blackwood .............. | C09D 7/43 428/35.2 |

FOREIGN PATENT DOCUMENTS

| | | | | |
|---|---|---|---|---|
| CN | 102925012 | A | * | 2/2013 |
| CN | 102925012 | A | | 2/2013 |
| CN | 104710908 | A | | 6/2015 |

(Continued)

OTHER PUBLICATIONS

DE-102005052202-A1 machine translation (Year: 2007).*

(Continued)

*Primary Examiner* — Anthony J Green
*Assistant Examiner* — Marites A Guino-O Uzzle

(57) ABSTRACT

The present disclosure is directed to an aqueous dispersion of inorganic fibers and a method for formulating an aqueous coating composition therefrom. The aqueous dispersion of inorganic fibers comprises water, inorganic fibers, a dispersing agent, an anti-settling agent and optionally additional additives, wherein the inorganic fibers have an average fiber diameter of from 1 micron to 100 microns and have a number average aspect ratio of from 1.1:1 to 10:1; and wherein the aqueous dispersion does not contain a film-forming amount of a polymeric resin.

20 Claims, 1 Drawing Sheet

(56) References Cited

FOREIGN PATENT DOCUMENTS

| DE | 102005052202 | | 5/2007 | |
|---|---|---|---|---|
| DE | 102005052202 A1 | * | 5/2007 | ......... C01B 33/1485 |
| JP | 2002256174 A | * | 9/2002 | |
| WO | 2004037931 | | 5/2004 | |

OTHER PUBLICATIONS

Laun, H.M. Orientation effects and rheology of short glass fiber-reinforced thermoplastics. Colloid & Polymer Sci 262, 257-269 (1984). doi:10.1007/BF01410464 (Year: 1984).*
Nanjing Capatue Chemical Co. chemical listings (see highlight, chemBlink premium supplier since 2008) (Year: 2008).*
Nanjing Capatue Chemical Co.5919-73-3 Ilsting (Year: 2008).*
Ahmad, Farrah & Jaafar, Mariatti & Palaniandy, Sam & Khairun Azizi, Azizli. (2008). Effect of particle shape of silica mineral on the properties of epoxy composites. Composites Science and Technology—Composites Sci Technol. 68. 346-353. DOI: 10.1016/j.compscitech. 2007.07.015. (Year: 2008).*
De Temmerman, Pieter-Jan et al. "Quantitative characterization of agglomerates and aggregates of pyrogenic and precipitated amorphous silica nanomaterials by transmission electron microscopy." Journal of nanobiotechnology vol. 10 24. Jun. 18, 2012, doi: 10.1186/1477-3155-10-24 (Year: 2012).*
JP-2002256174-A, machine translation (Year: 2002).*
SpecialChem. Rheology Modifiers Selection for Paints & Coatings (2017). [retrieved from the internet at Jun. 6, 2023 from <URL:https://coatings.specialchem.com/selection-guide/rheology-modifiers-selection-for-waterborne-and-solventborne-coatings>]. (Year: 2017).*
CN-102925012-A, machine translation (Year: 2013).*
PCT International Search Report, International Application No. PCT/US2018/018672, dated May 11, 2018.
PCT Written Opinion of the International Searching Authority, International Application No. PCT/US2018/018672, dated May 11, 2019.
First Office Action and Search Report for Chinese Application No. 201710092628.2, dated Sep. 25, 2020, 11 pages.
Hejun Li et al.:"Advanced Composite Materials", Published by Northwest Industrial University Press, First Printed in Dec. 31, 2016, pp. 382-383, 7pages.
First Office Action for European Application No. 18713422.6, dated Feb. 10, 2021, 5 pages.
Second Office Action for Chinese Application No. 201710092628.2, dated Mar. 23, 2021, 19 pages.
Third Office Action for Chinese Application No. 201710092628.2, dated Jun. 2021, 7 pages (including English translation of substantive objections).
First Office Action for European Application No. 18713422.6, dated Jun. 10, 2021, 6 pages.
Third Office Action for European Application No. 18713422.6, dated Oct. 5, 2021, 3 pages.

* cited by examiner

AQUEOUS DISPERSION OF INORGANIC FIBERS AND METHOD FOR FORMULATING AQUEOUS COATING COMPOSITION THEREFROM

CROSS-REFERENCE TO RELATED APPLICATION

The present disclosure claims the benefit of an International Patent Application No. PCT/US2018/018672 filed on Feb. 20, 2018, which claims the priority from Chinese Patent Application No. CN2017100926282, filed on Feb. 20, 2017, and entitled "Aqueous Dispersion of Inorganic Fibers and Method for Formulation Aqueous Coating Composition Therefrom", which are incorporated herein by reference to its entirety.

TECHNICAL FIELD

The present disclosure relates to an inorganic fiber and its application. In particular, the present disclosure relates to an aqueous dispersion of inorganic fibers. The present disclosure further relates to a process for formulating an aqueous coating composition from the aqueous dispersion of inorganic fibers and the coating formed from the coating composition.

BACKGROUND

With the development of society, there is an increasing demand for coatings having various properties, especially for coatings having mechanical properties such as high hardness, excellent scratch resistance and abrasion resistance, such as wood coatings, are required. It is known that paint films formed from wood coatings have relatively weak hardness, scratch resistance and abrasion resistance and are therefore easily scratched or worn. Addition of various inorganic fibers, including glass fibers, is one of the commonly used means to improve the mechanical properties of coatings. However, inorganic fibers have poor compatibility with the resin matrix, are difficult to uniformly disperse in the coating composition and easily cause sedimentation, and thus the mechanical properties of coatings such as paint film hardness, scratch resistance and abrasion resistance are hardly improved. It has been proposed that the coupling agent may be used to modify the inorganic fibers to improve the compatibility of the inorganic fibers with the resin matrix. However, coating compositions containing such inorganic fibers show only limited improvement in mechanical properties, with significant inorganic fiber settling, which is not satisfactory for people's needs.

There is still a need in the coating industry for an improved inorganic fiber system that can significantly improve the hardness, scratch resistance and abrasion resistance of coating.

SUMMARY

In one aspect, the present disclosure provides an aqueous dispersion of inorganic fibers, comprising: water, inorganic fibers, a dispersing agent, an anti-settling agent and optionally additional additives, wherein the inorganic fibers have an average fiber diameter of from 1 micron to 100 microns and have a number average aspect ratio of from 1.1:1 to 10:1; and wherein the aqueous dispersion does not contain a film-forming amount of a polymeric resin.

In some embodiments of the present disclosure, the inorganic fibers are surface modified with a coupling agent, preferably with amino.

In another aspect, the present disclosure provides a process for the formulation of an aqueous coating composition, comprising: i) formulating the aqueous dispersion of inorganic fibers according to the present disclosure; and ii) mixing the aqueous dispersion of step i) with water, an aqueous polymer latex and optionally additional additives to formulate the aqueous coating composition.

In yet another aspect, the present disclosure further provides a coating formed from the coating composition formulated with the aqueous dispersion according to the present disclosure. In one embodiment of the present disclosure, the coating does not exhibit significant blushing when it is subjected to bending or folding one or more times. In one embodiment of the present disclosure, the coating has a pencil hardness of at least H, as measured according to ASTM D3363. In one embodiment of the present disclosure, the coating is capable of resisting scratch loading of greater than 180 g, as measured according to ASTM D2197. In one embodiment of the present disclosure, the coating has a film thickness retention ratio of 75% or more, when it is subjected to brushing with an aqueous medium containing sand particles having a particle size of 300-400 mesh by wet abrasion scrub tester 500 cycles. In one preferred embodiment of the present disclosure, the coating has two or more, preferably three, more preferably four of above properties.

The inventors of the present disclosure inventively formulated an aqueous dispersion of inorganic fibers in which no film-forming amount of polymer resin is contained and found that the thus formulated aqueous dispersions, when added as a filler to an aqueous coating composition, may obtain a coating with significantly improved hardness, scratch resistance and abrasion resistance. Moreover, the inventors of the present invention have additionally found that the coating thus formed has a significantly improved blushing resistance.

The details of one or more embodiments of the disclosure are set forth in the following description. Other features, objects, and advantages of the disclosure will be apparent from the description and from the claims.

Selected Definitions

As used herein, "a", "an", "the", "at least one", and "one or more" are used interchangeably, unless indicated otherwise. Thus, for example, a coating composition that comprises "an" additive can be interpreted to mean that the coating composition includes "one or more" additives. Unless otherwise indicated herein, the use of the singular forms herein is also intended to include the plural forms.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

When used with inorganic fibers, the term "average fiber diameter" is one of parameters used to measure geometric dimensions of the inorganic fibers as determined by summing the diameters of the inorganic fibers to be tested and then averaging them. In some embodiments of the present disclosure, the average fiber diameter is in the range of 1 micron to 100 microns, preferably in the range of 1-50 microns, more preferably in the range of 2-25 microns, most preferably in the range of 5-15 microns.

When used with inorganic fibers, the term "number average aspect ratio" is one of parameters used to measure geometric dimensions of the inorganic fibers by summing the aspect ratios of the inorganic fibers to be tested and then dividing by the number of inorganic fibers to be tested. In one embodiment of the invention, the number average aspect ratio of fibers is in the range of 1.1:1 to 10:1, preferably in the range of 1.2:1 to 5:1, more preferably in the range of 1.6:1 to 1.7:1.

In the present disclosure, the phrase "the inorganic fibers having at least 50% by number of the fibers with an aspect ratio of 1.2:1 or greater" represents the geometric size distribution of inorganic fibers which is obtained by counting the inorganic fibers having a specific aspect ratio. In one embodiment of the present disclosure, at least 60%, at least 70%, or even at least 80% by number of the fibers in the inorganic fibers have an aspect ratio greater than or equal to 1.2:1.

In the present disclosure, the term "film-forming amount of a polymeric resin" means that such an amount of polymeric material that when it is added to a coating composition, the obtained coating composition after applied to substrate and removed any optional carrier (such as solvent or water) can form a continuous coating film. In the context of the present disclosure, the polymeric resins include, but are not limited to, silicone resins, alkyd resins, phenolic resins, polyester resins, acrylates resins, polyurethane resins or any other polymer resins known to those skilled in the art that can be used to prepare coating combinations. The film forming amount of the polymer resin in the coating composition is usually 5 to 80% by weight, preferably 10 to 80% by weight, more preferably 20 to 80% by weight, based on the total amount of the coating composition.

In the present disclosure, the phrase "aqueous dispersion does not contain a film-forming amount of a polymeric resin" means that the aqueous dispersion contains such a low amount of the polymer resin that it cannot form a continuous coating film. For example, in aqueous dispersions, the polymeric resin is present in an amount of less than 5% by weight relative to the total weight of the aqueous dispersion, preferably less than 4% by weight, more preferably less than 3% by weight, still more preferably less than 2% by weight, even more preferably less than 1% by weight, most preferably not present at all.

The term "without significant blushing" when used with a coating refers that the coating does not exhibit any invisible change in color observed with naked eye when it is subjected to bending or folding one or more times. In one embodiment of the present disclosure, the coating does not exhibit any invisible change in color observed with naked eye when it is subjected to bending or folding two or more times.

In the present disclosure, a numerical range defined by an endpoint includes all any numerical value within that range, for example, a range of 1 to 5 encompasses numerical values of 1, 1.5, 2, 2.75, 3, 3.80, 4, 5, and the like. Also, the disclosed range of values includes all sub-ranges within that broader range, for example a range of 1 to 5 includes sub-ranges of 1 to 4, 1.5 to 4.5, 1 to 2, and the like.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DRAWINGS DESCRIPTION

DETAILED DESCRIPTION

Figure 1:
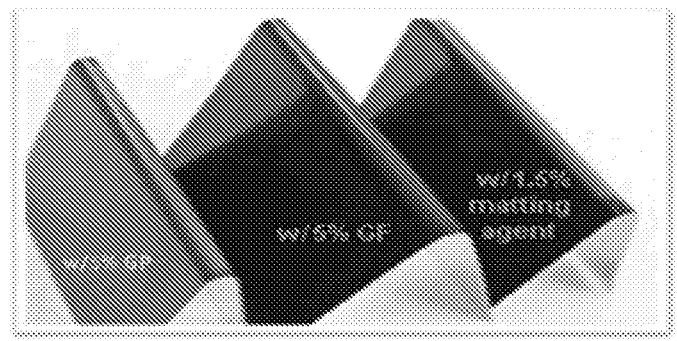
FIG. 1 shows blushing resistance of exemplary coatings of the present disclosure which contain 5% by weight of an aqueous dispersion of inorganic fibers (GF) of the present disclosure, 5% by weight of a glass powder (GP) and 1.5% by weight matting agent.

In one aspect, the present disclosure provides an aqueous dispersion of inorganic fibers, comprising: water, inorganic fibers, a dispersing agent, an anti-settling agent and optionally additional additives, wherein the inorganic fibers have an average fiber diameter of from 1 micron to 100 microns and have a number average aspect ratio of from 1.1:1 to 10:1; and wherein the aqueous dispersion does not contain a film-forming amount of a polymeric resin.

According to the present disclosure, the aqueous dispersion of inorganic fibers is different from an aqueous coating composition containing a film-forming amount of polymeric resins therein, which does not contain a film-forming amount of polymeric resins and thus is also known as "inorganic fiber paste". The present aqueous dispersion contains a very small amount of polymeric resin and even does not contain polymeric resins, so that it cannot form a continuous coating film. For example, in the present aqueous dispersion of inorganic fibers, the polymeric resin is present in an amount of less than 5% by weight, preferably in an amount of less than 4% by weight, more preferably in an amount of less than 3% by weight, still more preferably in an amount of less than 2% by weight, even more preferably in an amount of less than 1% by weight, most preferably not present at all.

In the coating industry, it is known to formulate inorganic pigments or fillers such as titanium dioxide, iron black oxide, glass powder and the like into a pigment slurry or a filler slurry for use as colorants for coloration convenience. However, it is seldom to propose and prepare an inorganic fibers slurry so far. According to the present disclosure, an inorganic fiber is a material composed of a plurality of elongated inorganic mineral fibers having a certain aspect ratio which is structurally different from inorganic particles having a particulate or irregular shape like spherical or flake, such as glass powder. As a typical example, glass fibers, silica fibers, boron fibers, ceramic fibers, metal fibers or combination thereof may be given. Preferably, in one embodiment of the present disclosure, glass fibers are used as inorganic fibers.

According to the present disclosure, the inorganic fibers have a specific geometric size. In this context, average fiber diameter and number average aspect ratio are parameters for measuring geometric dimensions of the inorganic fibers. The average fiber diameter represents the number average of the diameters of the inorganic fibers as determined by dividing the sum of the diameters of all the inorganic fiber samples to be tested by the number of inorganic fiber samples to be tested. In some embodiments of the present disclosure, the inorganic fibers have an average fiber diameter of from 1 micrometer to 100 micrometers, preferably from 1 to 80 micrometers, more preferably from 1 to 50 micrometers, most preferably from 5 to 15 micrometers. The number average aspect ratio represents the number average of the aspect ratio of the inorganic fibers, which is determined by dividing the sum of the aspect ratios of all the inorganic fiber samples to be tested by the number of inorganic fibers in the inorganic fiber sample to be tested. In some embodiments of the present disclosure, the inorganic fibers have a number average aspect ratio in the range of 1.1:1 to 10:1, preferably in the range of 1.1:1 to 5:1, more preferably in the range of 1.2:1 to 5:1, still more preferably in the range of 1.2:1 to 3:1 and most preferably in the range of 1.6:1 to 1.7:1. Methods for measuring diameters and aspect ratios are known in the art. For example, the diameter and aspect ratio of inorganic fibers can be measured using a Leica DV M6 A microscope and analyzed using LAS software equipped with the Master module.

In general, the geometric size of inorganic fibers has some influence on its application. In coating applications, elongated inorganic fibers, such as inorganic fibers, having a length of 1 mm or greater are generally less preferred. In a preferred embodiment of the present disclosure, the inorganic fibers have an average fiber diameter of 5 to 15 microns and have a number average aspect ratio of 1.6:1 to 1.7:1.

Preferably, the inorganic fibers according to the present disclosure has a certain size distribution. In the inorganic fibers according to the present disclosure, at least 50% by number of fibers have an aspect ratio of 1.2:1 or more. In some embodiments of the present disclosure, at least 60%, preferably at least 70%, or more preferably at least 80% by number of the fibers have an aspect ratio greater than or equal to 1.2:1. More preferably, at least 50%, preferably at least 60%, more preferably at least 70%, or even more preferably at least 80% by number of fibers in the inorganic fibers have an aspect ratio of in the range from 1.2:1 to 2.0:1.

The inventors of the present disclosure have surprisingly found that inorganic fibers (for example glass fibers) having the above-mentioned geometric size and/or size distribution are particularly suitable for improving hardness, scratch resistance and abrasion resistance of coatings and even are capable of further improving blushing resistance of the coating over solid particles such as glass powder. Without wishing to be bound by any theory, the inventor believes that inorganic fibers, structurally distinct from the solid particles, are an elongated body having a length dimension much greater than the transverse dimension of its width and thickness. The fibrous materials of this construction, when used in a coating, are capable of effectively cushioning forces from the outside, thereby reducing the likelihood of occurring micro-cracks in the interior of the coating. Thus, coatings containing inorganic fibers do not blush significantly after being subjected to one or more bending or folding.

In a preferred embodiment of the present disclosure, the inorganic fibers are surface modified with a coupling agent, preferably with amino. According to the present disclosure, the coupling agent is a substance for surface modification of inorganic fibers which is capable of providing inorganic fibers with one or more functional groups, preferably with amino, hydroxyl, carboxyl, epoxy functional groups or combinations thereof, more preferably with amino groups. In an embodiment of the present disclosure, the coupling agent may include a silane coupling agent, a titanate coupling agent, an aluminate coupling agent, or a mixture thereof.

In an embodiment of the present disclosure, the coupling agent comprises a silane compound having the formula:

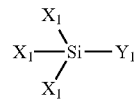

in which each $X_1$ is independently —Cl, —OCH$_3$, —OCH$_2$CH$_3$, —OC$_2$H$_4$OCH$_3$, —OSi(CH$_3$)$_3$, or —OCOCH$_3$; and $Y_1$ is an alkyl group substituted with —Cl, —NH$_2$, —SH, —OH, epoxy, —N$_3$, γ-methacryloxypropyl or isocyanate group, preferably an alkyl group with —NH$_2$. Preferably, the silane compound comprises γ-methacryloxypropyl trimethoxy silane, 3-aminopropyltriethoxysilane, γ-glycidoxypropyl trimethoxysilane or mixtures thereof, preferably 3-aminopropyltriethoxysilane.

In another embodiment of the present disclosure, the coupling agent comprises an oligomeric silane having the formula:

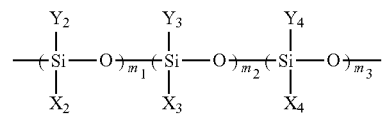

wherein each of $X_2$, $X_3$ and $X_4$ is independently —Cl, —OCH$_3$, —OCH$_2$CH$_3$, —OC$_2$H$_4$OCH$_3$, —OSi(CH$_3$)$_3$, —OCOCH$_3$, —H, —CH$_3$, —C$_2$H$_5$, and OH with the proviso that at least one of $X_2$, $X_3$ and $X_4$ is not —H, —CH$_3$, —C$_2$H$_5$, or —OH; each of $Y_2$, $Y_3$ and $Y_4$ is independently an alkyl group substituted with —Cl, —NH$_2$, —SH, —OH, epoxy, —N$_3$, γ-methacryloxypropyl or an isocyanate group, preferably with —NH$_2$; and each of $m_1$, $m_2$ and $m_3$ independently is from 0 to 200, with the proviso that at least one of $m_1$, $m_2$ and $m_3$ is not 0. Preferably, each of $Y_2$, $Y_3$ and $Y_4$ is independently an alkyl group substituted with —NH$_2$.

In another embodiment of the present disclosure, the coupling agent comprises a titanate. Titanate is known in the art, preferably having the formula:

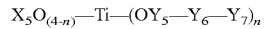

wherein $X_5O$ is a hydrolyzable short chain alkoxy, preferably $C_{1-6}$ alkyloxy, such as methoxy and ethoxy;
$OY_5$ is a carboxyl, sulfonic, or phosphate group;

$Y_6$ is a long chain alkyl group, preferably $C_{12-24}$ alkyl, such as lauryl, cetyl or stearyl;

$Y_7$ is a hydroxyl, thiol, amino, or epoxy group; and n is 2 or 3.

In another embodiment of the present disclosure, the coupling agent comprises an aluminate. As one example of aluminate, distearoyl isopropoxy aluminate, trimethyl aluminate, triisopropyl aluminate, tribenzyl aluminate or a mixture thereof may be used. Preferably, DL-411, DL-411AF, DL-411D, DL-411DF or ASA may be used as the aluminate.

In the surface modification of inorganic fibers with a coupling agent, those skilled in the art may determine the conditions for surface modification of inorganic fibers with coupling agents, including use of solvents, reaction temperature, reaction time, and the like, based on the type of inorganic fibers and coupling agents.

In one particular embodiment of the present disclosure, the step of surface modifying inorganic fibers with a coupling agent is performed by mixing the inorganic fibers with the coupling agent in an alcohol solution at a pH of about 5.0, and then heating the mixture to a higher temperature (e.g., 120° C.) for a period of time (e.g., 3-6 hours) to yield an inorganic fiber modified with coupling agent. The resulting inorganic fibers can be used directly for further processing or can be separated from the reaction mixture and dried for use.

In the aqueous dispersion according to the present disclosure, the amount of the inorganic fibers can be adjusted within a wide range, preferably in the range of 10 to 80% by weight, preferably in the range of 20 to 80% by weight, more preferably in the range of 20 to 70% by weight, more preferably 30 to 70% by weight. The inventors of the present invention have surprisingly found that the aqueous dispersions of the present disclosure may contain higher amounts of inorganic fibers and keep stable. In some embodiments of the present disclosure, the amount of inorganic fibers can even be as high as 50-80% by weight, preferably in the range of 60-80% by weight, more preferably in the range of 60-70% by weight.

The aqueous dispersion according to the present disclosure also contains a dispersant. The dispersant is adsorbed onto at least a portion of the surface of the inorganic fibers to increase the lyophilicity of the inorganic fibers, thereby enhancing the dispersibility of the inorganic fibers in water. As the dispersant, an anionic dispersant, a polymeric dispersant, a nonionic dispersant, or a combination thereof may be used. As a typical example, the anionic wetting and dispersing agent includes SN-5027, SN5034 and SN-5040 produced by Shenzhen Haichuan Chemical Co., Ltd. or Orotan 731A manufactured by Rohm and Haas Company of the U.S.A.; and the polymerirc wetting and dispersing agent includes Hydropalat 3204, Hydropalat 759, Hydropalat 100 produced by Shenzhen Haichuan Chemical Co., Ltd., DP512, DP518 produced by Taiwan Deqian Co., Ltd., Orotan 1124, Orotan 1288 produced by Rohm and Haas Company of the U.S.A., and the nonionic wetting and dispersing agents include X-405 produced by Rohm and Haas Company of the U.S.A., PE-100, Hydropalat 436 produced by Shenzhen Haichuan Chemical Co., Ltd., and so on.

In the aqueous dispersion according to the present disclosure, the amount of the dispersant may be adjusted within a suitable range, preferably in the range of 0.2 to 5% by weight, preferably in the range of 0.2 to 3% by weight, more preferably 0.2 to 1% by weight %, still more preferably in the range of 0.2-0.5% by weight.

The aqueous dispersion according to the present disclosure also contains an anti-settling agent. The anti-settling agent is used to increase the viscosity of the system, thereby inhibiting the settling of the inorganic fibers. As an anti-settling agent, bentonites such as Attagel 50 produced by BASF in Germany can be used.

In the aqueous dispersion according to the present disclosure, the amount of the anti-settling agent may be adjusted within a suitable range, preferably in the range of 1 to 5% by weight, preferably in the range of 1.2 to 4% by weight, more preferably in the range of 1.2 to 3 By weight, still more preferably in the range of 1.2 to 1% by weight.

The present inventors have surprisingly found that inorganic fibers can be effectively dispersed with the aid of both dispersant(s) and anti-settling agent(s) to form a stable aqueous dispersion of inorganic fibers, especially in the case that the inorganic fibers are surface modified, with amino group. The aqueous dispersion of inorganic fibers of the present disclosure contains less than 5%, preferably less than 4%, more preferably less than 3.5%, by weight of sediment after standing for three months at room temperature.

Without wishing to be bound by any theory, the inventor provides the following explanation in order that the present invention may be better understood. In the present aqueous dispersion of inorganic fibers, the dispersant is adsorbed spontaneously onto the surface of the inorganic fibers, thereby significantly increasing the lyophilicity of the inorganic fibers, so that the inorganic fibers are easily dispersed in the aqueous medium. In the case that surface-modified inorganic fibers, such as amino-modified inorganic fibers are used, the dispersant is more easily adsorbed on the surface of the inorganic fibers by hydrogen bonding or van der Waals attractive force so that the inorganic fibers can be more uniformly dispersed in the system. At the same time, the anti-settling agent can significantly increase the viscosity of the system. With the synergistic effect of both dispersant(s) and anti-settling agent(s), the dispersing effect of inorganic fibers in water is greatly enhanced, thereby enabling the formation of a stable dispersion.

In the present invention, the aqueous dispersions may optionally further comprise additional additives commonly used in aqueous dispersions which do not adversely affect the aqueous dispersions or the cured coating obtained from the coating compositions comprising the aqueous dispersion. Examples of additives which may be included are pigments, anti-migration aids, antibacterial agents, biocides, defoamers, colorants, waxes, antioxidants, anticorrosion agents, flow control agents, thixotropic agents, adhesion promoters, UV stabilizers, thickening agents, pH adjusting agents, or combinations thereof. The content of each optional ingredient is sufficient to serve its intended purpose, but preferably such an amount does not adversely affect the aqueous dispersion. In a preferred embodiment of the invention, suitable additional additives include defoamers, pH adjusting agents, bactericides, mildewcides, or any combination thereof.

In one embodiment of the present disclosure, there is provided an aqueous dispersion comprising: 5 to 80% by weight of water; 10 to 80% by weight of inorganic fibers; 0.2-5% by weight of dispersant; 1-5% by weight of anti-settling agent; and 0-30% by weight of additional additives relative to the total weight of the aqueous dispersion.

In another embodiment of the present disclosure, there is provided an aqueous dispersion comprising: 6 to 40% by weight of water; 50 to 80% by weight of inorganic fibers, from 0.2 to 5% by weight of dispersant, from 1 to 5% by weight of anti-settling agent, and from 0 to 30% by weight of additional additives relative to the total weight of the aqueous dispersion.

The aqueous dispersions according to the present disclosure are formulated by weighing water, inorganic fibers, dispersants, anti-settling agents, optionally with additional additives, in a desired ratio, and dispersing them at a high speed of 3000-3500 rpm for 30-45 minutes, to formulate an aqueous dispersion of inorganic fibers.

The aqueous dispersion of inorganic fibers thus prepared has good storage stability and is suitable for the direct formulation of aqueous coating compositions, which greatly simplifies the formulation of aqueous coating compositions and avoids or reduces the settling of inorganic fibers.

Formulation of an Aqueous Coating Composition

In a further aspect, the present invention also provides a process for the formulation of an aqueous coating composition, comprising: i) formulating the aqueous dispersion according to the present disclosure; and ii) mixing the aqueous dispersion of step i) with water, an aqueous polymer latex and optionally additional additives to formulate the aqueous coating composition.

The amount of the aqueous dispersion of inorganic fibers according to the present disclosure is in the range of 2 to 30 wt %, preferably 5 to 25 wt %, more preferably 5 to 20 wt %, still more preferably in the range of 5 to 15 wt % relative to the total weight of the aqueous coating composition.

As the aqueous polymer latex, an aqueous silicone emulsion, an aqueous acrylics emulsion, an aqueous vinyl polymer emulsion, an aqueous polyurethane emulsion, or any aqueous latex suitable for use in an aqueous coating composition may be used. Specifically, the aqueous polymer latex may be an aqueous silicone emulsion, an aqueous styrene-acrylate emulsion, an aqueous acrylates emulsion, an aqueous silicone-modified acrylates emulsion, an aqueous vinyl acetate emulsion, an aqueous vinyl acetate-acrylates emulsion, an aqueous vinyl acetate-ethylene emulsion, an aqueous vinyl acetate-acrylates-ester of versatic acid emulsion, and combinations thereof.

The content of the aqueous polymer latex is suitably in the range of 20 to 99% by weight, preferably in the range of 40 to 96% by weight, more preferably in the range of 50 to 90% by weight, even more preferably in the range of 60 to 85 wt % with respect to the total weight of the aqueous coating composition.

The present aqueous coating composition may optionally include additional additives for an aqueous coating composition which do not adversely affect the coating composition or a resultant coating obtained therefrom. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are, for example, carriers, emulsifiers, coalescing agents, co-solvents, pigments, fillers, anti-migration aids, antibacterial agents, chain extenders, lubricants, wetting agents, biocides, plasticizers, defoamers, colorants, waxes, antioxidants, anticorrosion agents, flow control agents, thixotropic agents, dispersants, adhesion promoters, UV stabilizers, thickeners, a defoaming agent, a pH adjusting agent, or a combination thereof. Each optional ingredient is present in an amount sufficient to achieve its intended purpose, but preferably such an amount does not adversely affect the coating composition or the cured coating obtained therefrom. In a preferred embodiment of the present disclosure, suitable additional additives include thickener, dispersant, defoaming agent, a PH adjuster, bactericides, mildewcides, or any combination thereof.

The content of the additional additives is in the range of 0 to 70% by weight, preferably in the range of 0.1 to 70% by weight with respect to the total weight of the aqueous coating composition. In an embodiment of the present disclosure, the aqueous coating composition comprises about 0.1 to about 10% by weight of additional additives relative to the total weight of the aqueous coating composition. Specifically, the amount of additional additives in the aqueous coating composition is from about 0.2%, 0.3%, about 0.4%, about 0.6%, about 0.7%, about 0.8% or about 0.9% by weight to about 9.0%, about 7.0%, about 6.0%, about 5.0%, about 4.0%, about 2.0%, or about 1.0% by weight relative to the total weight of the coating composition.

In an embodiment of the present disclosure, the aqueous coating composition comprises, relative to the total weight of the aqueous coating composition, 5-15% by weight of the aqueous dispersion of inorganic fibers, 20-95% by weight of the aqueous polymer latex; and 0-70% by weight of the additional additives.

In the present disclosure, the coating composition can be prepared by any suitable method known to one of ordinary skill in the art. For example, the coating composition can be made by adding all of the components to the container and then stirring the resulting mixture until homogeneous. Alternatively, the coating composition can be made by first mixing some of the components and then adding the rest of the other components to form a homogeneous mixture.

According to the present disclosure, the coating composition can be applied by customary coating methods known to a person skilled in the art. The coating methods include dip coating, spin coating, spray coating, curtain coating, brush coating, roll coating, and other coating methods known in the art. In the present invention, the coating is applied in a wet-on-dry process. Typically, the solvent in the coating composition is removed by natural or accelerated (heat) drying to form a coating.

Thus, the present disclosure also provides a coating formed from a coating composition comprising the aqueous dispersion of inorganic fibers as described herein. The coatings of the present disclosure may exhibit one or more of the following properties: no blushing when subjected to bending or folding; a pencil hardness of at least H; a scratch resistance of 180 g or more, more preferably 200 g or more; a film thickness retention of 75% or higher after 500 cycles of wet abrasion.

In some embodiments, the coating of the present disclosure does not exhibit significant blushing when subjected to one or more bending or folding.

In some embodiments, the coating of the present disclosure has a pencil hardness of at least H when measured according to ASTM D3363.

In some embodiments, the coating of the present disclosure is capable of withstanding a scratch load of 180 g or higher when measured in accordance with ASTM D2197.

In some embodiments, the coating of the present disclosure has a film thickness retention of 75% or more, such as 80%, 85%, 90% or more, for example, when subjected to 500 cycles of a wet abrasion tester REF 903 available from Sheen, England with an aqueous medium comprising grit particles having a particle size of 300-400 mesh.

The invention also provides a coated article comprising a substrate; and a coating according to the invention coated on the substrate. The substrate can be any coatable material.

Those skilled in the art can select and determine a suitable material as a substrate according to actual needs. In some preferred embodiments, the article according to the invention may be a wood substrate, a metal substrate, a cement product, a ceramic, a plastic substrate or a building wall or the like.

Testing Method

Unless otherwise indicated, the following test methods were used in the following examples.

Inorganic Fiber Diameter and Aspect Ratio

Put 1-2 g of glass fibers in a glass beaker and pour 25 g of pure water; then, sonicate to disperse the glass fibers in the water; drop the glass fiber suspension onto the glass slide, cool it with cool air from dryer; place the slide under a digital microscope (Leica DVM6 A) and take a picture of the fiberglass; and make analysis and statistics in the LAS software equipped with the Master module under the Grain Size function.

Gloss

This test was performed according to ASTM D523 to assess the gloss of the coating.

Adhesion

Adhesion test was performed to assess whether the coating adheres to the coated substrate. The adhesion test was performed according to ASTM D 3359 method B with the level of 0-5B.

Pencil Hardness

This test was performed to measures the hardness of a cured coating. Pencil hardness was assessed using ASTM D3363. The data is reported in the form of the last successful pencil prior to film rupture. Thus, for example, if a coating does not rupture when tested with a 2H pencil, but ruptures when tested with a 3H pencil, the coating is reported to have a pencil hardness of 2H.

Dry Film Transparency

This test was performed to assess the optical property of a cured coating. The formulated samples were drawn down on clear PVC panel in a wet thickness of about 100 microns and then dried enough for 3 days. After that, the film transparency was checked by reflectivity meter, for example with RT-6000 available from US Oakland.

Anti-Scratch Performance

This test was performed to assess scratch resistance of a cured coating under a load of a certain weight in g. The formulated samples were drawn down on metal panels in a wet thickness of about 100 microns and then dried enough for 3 days followed by checking the dry film thickness. After that the anti-scratch resistance was carried out by anti-scratch machine according to ASTM D2197. The results were recorded as to the weight of test-to-fail.

Abrasion Resistance

This test was performed to assess abrasion resistance of a cured coating, which was measured by film retention ratio in %. The formulated samples were drawn down on black PVC side by side in a wet thickness of about 100 microns and then dried enough for 3 days followed by checking the dry film thickness. After that the abrasion resistance was carried out by abrasion machine. After brushing 500 times, the test stopped followed by confirming the film retention ratio in %.

Blushing Resistance

This test was performed to assess bending resistance of a cured coating, which was observed by naked eye visually. The formulated clear samples were applied on black primer in a thickness of about 20-30 microns and dried to obtain a dry film thickness of 50-60 microns. Before testing, the film was air dried for 7 days. After the coatings were dried completely, the samples were bended by folding themselves and observed whether the bended portion turned pale.

Examples

The present disclosure is further described in the following examples that are intended as illustrations only. It is to be understood that the particular examples, materials, amounts, and procedures are to be interpreted broadly in accordance with the scope and spirit of the present inventions as set forth herein.

Unless otherwise noted, all parts, percentages, and ratios reported in the following examples are on a weight basis. Unless otherwise specified, all chemicals are used are commercially available.

Example 1 an Aqueous Glass Fiber Slurry

Surface Modification of Glass Fibers

The surface modification of glass fibers was carried out as below. KH550 was used as a coupling agent and XGFT 91000 available from Shenzhen XianGu High-Tech. Co., LTD, China was used as glass fiber. To a reactor, glass fiber was added followed by xylene. After that, KH550 and triethylamine as catalyst were added to the reaction flask subsequently. The reaction mixture was heated to 120° C. for 3-6 hours, and then resulting product was filtered by removing and dried for storage. The surface modified glass fiber was obtained using the ingredients of Table 1 below.

TABLE 1

| Raw Materials | Description | AMOUNT (g) |
| --- | --- | --- |
| XGFT 91000 | Glass fiber, having an average fiber diameter of 12.5 μm and a number average aspect ratio of 1.6-1.7 | 100 |
| Xylene | Solvent | 150 |
| KH550 | Amino functional silane | 1-5 |
| Triethylamine | Catalyst | 0.01-0.05 |

Aqueous Glass Fibers Slurry

The aqueous glass fibers paste was formulated using the ingredients of table 2 below.

TABLE 2

| Raw materials | Wt % | Description |
| --- | --- | --- |
| Water | 7.44 | Solvent |
| NP5040 | 0.32 | Dispersant |
| Attagel 50 | 1.42 | Anti-settling additive |
| Tego 822 | 24.15 | Defoamer |
| Glass fiber | 66.67 | Modified Glass Fiber |
| Total | 100 | |

Example 2-Aqueous Latex Paint with Above Aqueous Glass Fibers Slurry

An aqueous latex paint was formulated using the ingredients of table 3 below. As a control, a Base Resin is an acrylic latex available from Dow Company under the commercial name of Dow 3311. The formulations for the aqueous latex paint and the coating performance from the formulations were shown on table 3 below.

TABLE 3

| Components | Com. Ex | Example |
|---|---|---|
| Base resin (wt %) | 82 | 72 |
| Glass Fiber Paste from Example1 (wt %) | 0 | 10 |
| Defoamer (wt %) | 1.67 | 1.67 |
| Cosolvent (wt %) | 6.75 | 6.75 |
| Water (wt %) | 9.58 | 9.58 |
| Properties | | |
| Pencil hardness | HB | H |
| Adhesion | 5B | 4-5B |
| Gloss | 83 | 40 |
| Dry film transparency | Good | Good |
| Abrasion resistance | 54.5 | 90.5 |
| Anti-scratch (g, pass) | 50 | 200 |

From above results, it was shown that the aqueous dispersion of glass fiber greatly improved the coating in terms of its hardness, anti-scratch property and abrasion resistance.

Example 3—Blushing Resistance of Water Borne Coatings

In order to assess the effect of fillers on the blushing resistance of water borne coatings, the water borne paints was formulated by mixing a water borne clear paint with 5-15 wt % filling materials, such as a matting agent, glass powder or glass fibers. The formulation of the water borne paints and the color change of their dry film coatings were shown on table 4 below.

TABLE 4

| Items | Example 3-1 | Example 3-2 | Example 3-3 |
|---|---|---|---|
| Dipropylene Glycol methyl Ether (DPM) (wt %) | 2.5 | 2.5 | 2.5 |
| Dipropylene Glycol n-butyl Ether (DPNB) (wt %) | 2.0 | 2.0 | 2.0 |
| Texanol (wt %) | 2.0 | 2.0 | 2.0 |
| Dispersing Agent (wt %) | 0.5 | 0.5 | 0.5 |
| Defoamer (wt %) | 0.3 | 0.3 | 0.3 |
| Amino silane modified glass fibers (wt %) | 5 | 5 | 5 |
| Dow 3311(wt %) | 80 | 80 | 80 |
| Thickener (wt %) | 1 | 1 | 1 |
| Filling agent (wt %) | Matting Agent (5-15%) | Glass Powder (5-15%) | Glass Fiber Paste from Example 2-2 (5-15%) |
| blushing resistance | bad | fair | Excellent |

Figure 2:
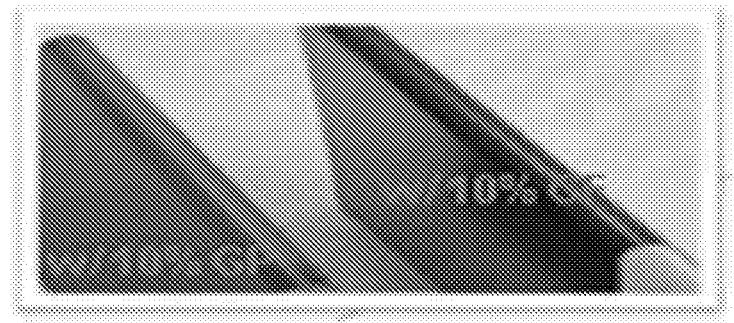
FIG. 2 shows blushing resistance of another exemplary coatings of the present disclosure which contain 10% by weight of the aqueous dispersion of the glass fibers (GF) according to the present disclosure and 10% by weight of glass powder (GP).

From above results, it was shown that addition of glass fiber paste results in a superior blushing resistance to the conventional matting agent and glass powders, as shown in FIGS. 1 and 2.

While the invention has been described with respect to a number of embodiments and examples, those skilled in the art, having benefit of this disclosure, will appreciate that other embodiments can be devised which do not depart from the scope and spirit of the invention as disclosed herein.

What is claimed:

1. An aqueous dispersion of inorganic fibers, comprising: water, inorganic fibers, a dispersing agent, an anti-settling agent and optionally additional additives,
    wherein the inorganic fibers comprise glass fibers;
    wherein the inorganic fibers have an average fiber diameter of from 1 micron to 100 microns and have a number average aspect ratio of from 1.1:1 to 5:1; and
    wherein the aqueous dispersion does not contain a film-forming amount of a polymeric resin.

2. The aqueous dispersion according to claim 1, wherein the inorganic fibers have an average fiber diameter of from 1 micron to 50 microns.

3. The aqueous dispersion according to claim 1, wherein the inorganic fibers have at least 50% by number of the fibers with an aspect ratio of 1.2:1 or greater.

4. The aqueous dispersion according to claim 1, wherein the inorganic fibers further comprises silica fibers, boron fibers, ceramic fibers, metal fibers or combination thereof.

5. The aqueous dispersion according to claim 1, wherein the dispersing agent comprises an anionic dispersing agent, a polymeric dispersing agent, a non-ionic dispersing agent or combination thereof.

6. The aqueous dispersion according to claim 1, wherein the anti-settling agent comprises bentonite.

7. The aqueous dispersion according to claim 1, wherein the inorganic fiber is surface modified with a coupling agent.

8. The aqueous dispersion according to claim 7, wherein the coupling agent comprises a silane coupling agent, a titanate coupling agent, an aluminate coupling agent or combination thereof.

9. The aqueous dispersion according to claim 8, wherein the coupling agent comprises a silane compound having structure of the following formula:

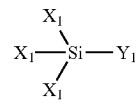

in which
    each $X_1$ is independently selected from the groups consisting of —Cl, —OCH$_3$, —OCH$_2$CH$_3$, —OC$_2$H$_4$OCH$_3$, —OSiMe$_3$, and —OCOCH$_3$; and
    $Y_1$ is an alkyl group terminated with —Cl, —NH$_2$, —SH, —OH, epoxy, —N$_3$, γ-methacryloxypropyl or isocyanate groups.

10. The aqueous dispersion according to claim 8, wherein the coupling agent comprises a silane compound comprising γ-methacryloxypropyl trimethoxy silane, 3-aminopropyltriethoxysilane, γ-glycidoxypropyl trimethoxysilane or the mixture thereof.

11. The aqueous dispersion according to claim 8, wherein the coupling agent comprises an oligomeric silane having structure of the following formula:

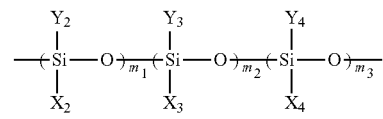

wherein each of $X_2$, $X_3$ and $X_4$ is independently selected from the group consisting of —Cl, —OCH$_3$, —OCH$_2$CH$_3$, —OC$_2$H$_4$OCH$_3$, —OSiMe$_3$, —OCOCH$_3$, —H, —CH$_3$, —C$_2$H$_5$, and —OH with the proviso that at least one of X$_2$, X$_3$ and X$_4$ is not —H, —CH$_3$, —C$_2$H$_5$, or —OH;

each of Y$_2$, Y$_3$ and Y$_4$ is independently an alkyl group ended with —Cl, —NH$_2$, —SH, —OH, epoxy, —N$_3$, γ-methacryloxypropyl or isocyanate groups; and each of m$_1$, m$_2$ and m$_3$ is from 0 to 200, with the proviso that at least one of m$_1$, m$_2$ and m$_3$ is not 0.

12. The aqueous dispersion according to claim 8, wherein the coupling agent comprises a titanate having a structure of the formula:

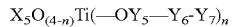

$$X_5O_{(4-n)}Ti(—OY_5—Y_6\text{-}Y_7)_n$$

wherein X$_5$O is a hydrolyzable short chain alkoxy;

OY$_5$ is carboxyl, sulfonic, or phosphate group;

Y$_6$ is a long chain alkyl group;

Y$_7$ is hydroxyl, thiol, amino, or epoxy group;

n is 2 or 3.

13. The aqueous dispersion according to claim 8, wherein the coupling agent comprises an aluminate compound comprising distearoyl isopropoxy aluminate, trimethyl aluminate, triisopropyl aluminate, tribenzyl aluminate or a mixture thereof.

14. The aqueous dispersion according to claim 1, comprising:

5-80 wt % of water, 10-80 wt % of the inorganic fibers, 0.2-5 wt % of the dispersing agent, 1-5 wt % of the anti-settling agent, and 0-30 wt % of additional additives, relative to the total weight of the aqueous dispersion.

15. The aqueous dispersion according to claim 1, comprising:

6-40 wt % of water, 50-80 wt % of the inorganic fibers, 0.2-5 wt % of the dispersing agent, 1-5 wt % of the anti-settling agent, and 0-30 wt % of additional additives, relative to the total weight of the aqueous dispersion.

16. A process for the formulation of an aqueous coating composition, comprising:

i) formulating the aqueous dispersion according to claim 1; and ii) mixing the aqueous dispersion of step i) with water, an aqueous polymer latex and optionally additional additives to formulate the aqueous composition.

17. A coating formed from the aqueous coating composition formulated by the process of claim 16, which does not exhibit significant blushing when it is subjected to bending or folding one or more times.

18. A coating formed from the aqueous coating composition formulated by the process of claim 16, which has a pencil hardness of at least H, as measured according to ASTM D3363.

19. A coating formed from the aqueous coating composition formulated by the process of claim 16, which is capable of resisting scratch loading of 180 g or more, as measured according to ASTM D2197.

20. A coating formed from the aqueous coating composition formulated by the process of claim 16, which has a film thickness retention ratio of 75% or more, when it is subjected to brushing with an aqueous medium containing sand particles having a particle size of 300-400 mesh by wet abrasion scrub tester REF 903 available from Sheen, England 500 cycles.

* * * * *